Patented Feb. 14, 1950

2,497,312

UNITED STATES PATENT OFFICE 2,497,312

2-CHLOROTHIOPHANTHRAQUINONE

Henry R. Lee and Viktor Weinmayr, Pitman, N. J., assignors to E. I. du Pont de Nemours & Company, Wilmington, Del., a corporation of Delaware No Drawing. Application January 22, 1947, Serial No. 723,667

1 Claim. (Cl. 260—329)

This invention relates to new thiophanthraquinones, and more particularly to the preparation of 2-chlorothiophanthraquinones of the formula:

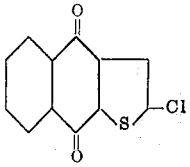

The term "thiophanthraquinone" is employed in the naming of this compound in view of the original name used by Scholl and Seer, Ann. 394, 131 (1912), who called the corresponding hydrocarbon compound the "thiophanthracene."

This invention has for its object the preparation of new organic compounds particularly suitable as intermediates for the preparation of dyes. A further object of the invention is to provide a commercially feasible process for the preparation of this new compound.

This new chlorothiophanthraquinone can be prepared by ring-closing the (5-chloro-2-thenoyl)-o-benzoic acid with the reagents commonly employed in the ring closure of benzoyl-o-benzoic acids. The preferred process for the preparation of these new compounds, however, is the ring closure of the (5-chloro-2-thenoyl)-o-benzoic acid in nitrobenzene by means of aluminum chloride. As illustrated in the following examples, the (5-chloro-2-thenoyl)-o-benzoic acid can be ring-closed without isolation when it has been formed by condensation of the alpha-chlorothiophene with phthalic anhydride in nitrobenzene. The preferred process, therefore, is to effect the condensation of the alpha-chlorothiophene with phthalic anhydride in nitrobenzene and in the presence of aluminum chloride at temperatures above 50° C., then adding an additional amount of aluminum chloride and raising the temperature to effect ring-closure to the 2-chlorothiophanthraquinone.

The following examples are given to illustrate the invention. The parts used are by weight.

Example 1

Five (5) parts of (5-chloro-2-thenoyl)-o-benzoic acid (obtained by the process disclosed in my co-pending application Serial No. 723,665) and 8 parts of phosphoric acid anhydride were added to 42 parts of nitrobenzene. The charge was heated to from 125° to 130° C. for 20 hours. It was then poured into 50 parts of dilute hydrochloric acid and steam distilled to remove the nitrobenzene. The crystalline residue was filtered, washed acid-free, slurried in warm dilute aqueous sodium carbonate to remove unreacted starting material, filtered again, washed and dried.

Four (4) parts of crude 2-chlorothiophanthraquinone melting from 175° to 180° C. was obtained, equal to a yield of 85.8% of theory. After crystallization from high boiling gasoline (about 40 parts of solvent per part of crude product), pure 2-chlorothiophanthraquinone, melting at from 178° to 179° C., was obtained.

Example 2

Five (5) parts of (5-chloro-2-thenoyl)-o-benzoic acid, as employed in Example 1, was added to a solution of 5 parts of anhydrous aluminum chloride in 42 parts of nitrobenzene. The reaction mass was heated to 120° C. for 20 hours and then poured into 50 parts of dilute hydrochloric acid. The nitrobenzene was removed with steam, the residue filtered, washed acid-free, extracted with warm dilute sodium carbonate, washed again and dried. Two (2) parts of crude 2-chlorothiophanthraquinone were obtained. After crystallization as in Example 1, it melted at from 178° to 179° C.

Example 3

Thirty (30) parts of anhydrous aluminum chloride and 15 parts of phthalic anhydride were dissolved in 120 parts of nitrobenzene. The solution was heated to 80° C. and 12 parts of alpha-chlorothiophene mixed with 12 parts of nitrobenzene were added at from 80° to 90° C. over a period of 20 minutes. The reaction mass was maintained at from 80° to 90° C. for one hour longer, then cooled to about 30° C. Ninety (90) parts of nitrobenzene and 28 parts of aluminum chloride were added. The temperature was raised to 120° C. and held at from 120° to 125° C. for 8 hours. The reaction mass was poured into dilute hydrochloric acid, steam distilled to remove the nitrobenzene, and the residue was filtered and washed acid-free. The insoluble residue was slurried in a solution of 20 parts of sodium hydroxide and 25 parts of sodium hydrosulfite in 1000 parts of water. The insoluble product was removed by filtration and the 2-chlorothiophanthraquinone was precipitated by adding m-nitrobenzene sodium sulfonate to the solution. The crude 2-chlorothiophanthraquinone was purified by distilling it at atmospheric pressure, and crystallizing it from high boiling gasoline, as in Example 1.

While in the above examples the ring-closure of the (5-chloro-2-thenoyl)-o-benzoic acid is carried out in nitrobenzene with aluminum chloride or phosphoric acid, this ring-closure may be effected by any suitable condensing agent. When sulfuric acid is employed, it is difficult to avoid sulfonation of the resulting product. Chlorinated benzenes may be employed in place of nitrobenzene as the reaction medium.

The ring-closure is preferably carried out at temperatures of from 90° to 170° C. when aluminum chloride is employed in nitrobenzene. The reaction time will, of course, depend upon the temperatures at which the reaction is carried out.

We claim:

2-chlorothiophanthraquinone.

HENRY R. LEE.
VIKTOR WEINMAYR.

REFERENCES CITED

The following references are of record in the file of this patent:

Steinkopf "Die Cheme Des Thiophens," Edwards Lithoprint, original 1941. Pages 70, 71. and 187.